Jan. 7, 1958   B. H. LOSCHING   2,818,980
WIRE TRAY FOR DRAINING PARTS OF MILKING MACHINES
Filed April 27, 1954

INVENTOR
BERNARD H. LOSCHING

BY
Manny Wright

ATTORNEYS

United States Patent Office 2,818,980
Patented Jan. 7, 1958

2,818,980

WIRE TRAY FOR DRAINING PARTS OF MILKING MACHINES

Bernard H. Losching, Janesville, Wis., assignor to The Schlueter Co., Janesville, Wis.

Application April 27, 1954, Serial No. 425,824

1 Claim. (Cl. 211—126)

This invention appertains to baskets, and more particularly to wire trays or baskets for facilitating the draining, drying and storing of various articles, such as rubber and other parts of a milking machine.

One of the primary objects of this invention is to provide a wire basket having an elongated body or tray portion for receiving articles and a rack disposed above and extending longitudinally of the tray or body portion for supporting teat cups in a vertical draining position, with the rack so arranged relative to the tray as to form an efficient handle for carrying and manipulating the basket during the washing and storing of articles.

Another salient object of my invention is to provide novel means for forming the body or tray portion relative to the rack, whereby vertically aligned cells will be provided so that the teat cups can be quickly racked and held in a vertical position against accidental displacement with the cups extending through the rack and the tray for proper draining.

A further object of the invention is to provide means whereby the basket can be suspended across a tank during the washing and draining process with the tray or body portion and the rack disposed within the plane of the walls of the tank.

Figure 1:
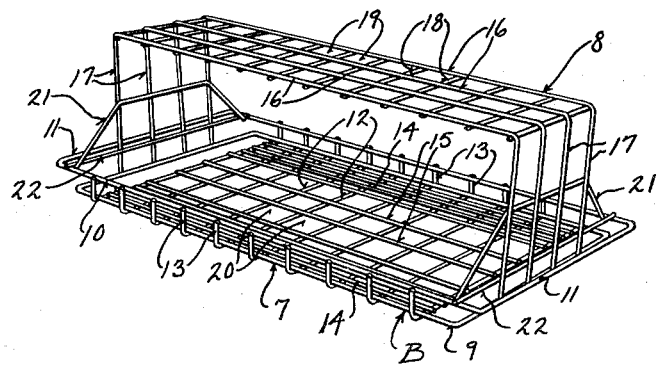
Figure 2:
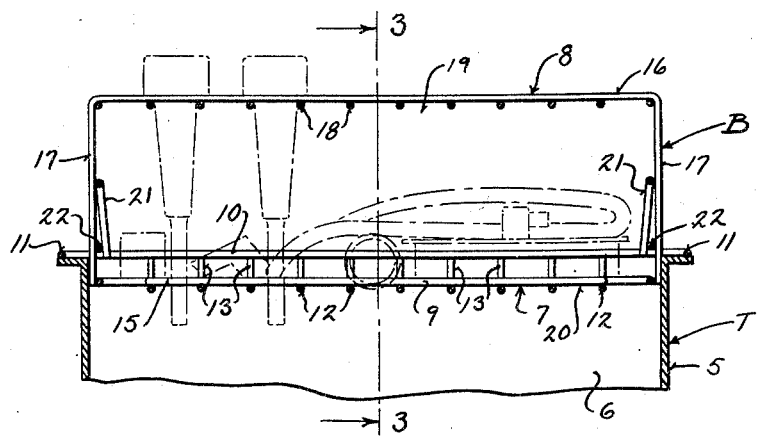
Figure 3:
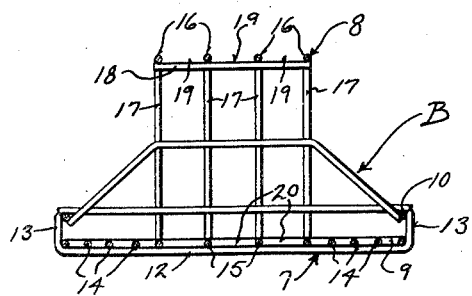

With these and other objects in view, the invention consists in the novel construction, arrangement and formation of parts as will be hereinafter more specifically described and claimed, and illustrated in the accompanying drawing, in which drawing, Figure 1 is a perspective view of the improved basket;

Figure 2 is a longitudinal sectional view through the basket showing the same associated with a washing tank, only a fragment of the tank being shown, the tank being in transverse cross-section; and Figure 3 is a transverse sectional view through the basket, taken on the line 3—3 of Figure 2, looking in the direction of the arrows.

Referring to the drawing in detail, wherein similar reference characters designate corresponding parts throughout the several views, the letter B generally indicates the improved basket and T a tank with which the same can be associated.

The tank T forms no part of the present invention and can include side walls 5 and end walls 6.

The basket B is preferably proportioned to extend transversely across the tank T as shown in Figure 2 so that articles can be efficiently held during the washing process and supported for draining. In view of the fact that the basket is utilized for washing, draining and storing of articles, the same is of an open work construction and is preferably formed from wire and includes a tray or body portion 7 and an elevated rack 8.

The tray or body portion 7 includes a bottom rectangular rim 9 and an upper spaced rectangular rim 10. The ends of the upper rim 10 extend beyond the ends of the lower rim 9 to provide arms 11 for supporting the basket on the side walls 5 of the tank T. The rims 9 and 10 are firmly joined together by equidistantly spaced transversely extending U-shaped cross wires 12 and these wires can be welded or otherwise fastened to the rims. By referring to Figure 3, it can be seen that the upwardly extending legs 13 of the cross wires embrace the rims. The cross wires in turn, are joined by longitudinally extending groups of side wires 14 and an intermediate group of longitudinally extending wires 15. The longitudinal wires 14 and 15 are welded, or otherwise fastened to the cross wires 12. The wires of the side groups 14 are arranged in close relation, while the intermediate group of wires 15 are arranged in relatively wide spaced relation for a purpose, which will later appear. It is obvious, however, that small articles can be supported by the group of side wires 14 and that larger articles can be safely supported by the intermediate group of wires 15.

The overhead rack 8 includes a plurality of strands of inverted U-shaped wires 16 and the downwardly extending legs 17 of these wires are welded or otherwise fastened to the ends of the lower rim 9. The wires 16 are equidistantly spaced and are braced and joined together by cross wires 18. The cross wires 18 and the longitudinal wires 16 define cells 19 which are vertically aligned with cells 20 defined by the intermediate group of wires 15 and the cross wires 12 of the tray. This is an important feature of the invention, as will later appear.

The overhead rack is further braced by end wires 21, which are of a substantially inverted U-shape and these brace wires 21 are welded or otherwise secured to the legs 17 of the wires 16 and to the top rim 10. If desired, the basket can be further braced by cross rods or wires 22 which are welded or otherwise secured to the upper rim 10, the legs 17 of the rack 8 and the legs of the inverted U-shaped braces 21.

In use of my basket, the same can be placed transversely of the tank T, with the ends of the upper rim 11 resting on the side walls of the tank T. This disposes the basket within the confines of the side and end walls and small articles as they are washed can be placed on the groups of side wires 14 and larger articles can be placed on the intermediate group of wires 15. Teat cups can be placed in the cells 19 and the vertical aligned cells 20 and thus the teat cups are held in vertical position for proper draining. The tray can be easily elevated and the washed articles can be stored away in the tray. The rack 18 forms an important part of the basket not only for the spacing and suspension of the teat cups properly, but as a carrying handle.

Changes in details may be made without departing from the spirit or the scope of this invention, but what I claim as new is:

A wire basket for the draining, drying and storing of articles comprising a bottom tray including a lower rectangular frame rim, an upper rectangular frame rim extending beyond the ends of the lower frame rim, groups of longitudinally extending closely arranged side wires and an intermediate group of longitudinally extending wires spaced a greater distance apart than the wires of the side groups, cross U-shaped brace wires connecting the longitudinal wires and extending across the lower frame and having upturned legs secured to the upper and lower frame rims, said cross brace wires defining in connection with the intermediate group of wires a number of rectangular cells, an elevated rack extending longitudinally of the tray and constituting a handle and including inverted U-shaped longitudinally extending wires with the legs thereof secured to the lower frame rim, the longitudinal wires of the rack being spaced the same distance apart as the intermediate group of wires of the tray and being spaced within the side group of wires, and cross wires connecting the wires of the rack defining in connection therewith a number of rectangular cells with the cells of the rack vertically aligned with the cells of the tray for receiving teat cups.

References Cited in the file of this patent

UNITED STATES PATENTS

| | | |
|---|---|---|
| D. 100,443 | Sherrick | July 14, 1936 |
| 828,694 | Weeks | Aug. 14, 1906 |
| 1,939,504 | Lee | Dec. 12, 1933 |
| 1,994,195 | Hay | Mar. 12, 1935 |
| 2,367,218 | Joyce | Jan. 16, 1945 |
| 2,523,272 | Bluhm | Sept. 26, 1950 |
| 2,552,983 | Lee | May 15, 1951 |
| 2,622,757 | Von Bromssen | Dec. 23, 1952 |